United States Patent
Mikjaniec et al.

(10) Patent No.: US 12,442,854 B1
(45) Date of Patent: Oct. 14, 2025

(54) APPARATUS, SYSTEM, AND METHOD FOR PERFORMING SELF-CONTAINED RELIABILITY TESTING ON COMPUTING DEVICES

(71) Applicant: Juniper Networks, Inc., Sunnyvale, CA (US)

(72) Inventors: Travis S. Mikjaniec, Freemont, CA (US); Elmer Tolentino, Livermore, CA (US); Amit Kumar Misra, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 193 days.

(21) Appl. No.: 18/317,845

(22) Filed: May 15, 2023

(51) Int. Cl.
   *G01R 31/28* (2006.01)

(52) U.S. Cl.
   CPC .................. *G01R 31/2874* (2013.01)

(58) Field of Classification Search
   CPC ...... Y02P 80/10; G06F 16/2477; G06F 17/18; G06F 18/20; G06F 11/22; G06F 1/20; G06F 2200/201; G06F 11/3409; G06F 30/20; G06F 11/008; G06F 2119/08; G06F 2200/203; G06F 11/1629; G06F 1/3296; G06F 11/3058; G06F 18/217; G06F 1/1677; G06F 1/206; G06F 1/3212; G06F 1/203; G06F 1/3215; G06F 1/324; G06F 1/3209; G06F 1/3293; G01R 19/003; G01R 19/2513; G01R 31/3646; G01R 31/3842; G01R 31/003; G01R 31/2817; G01R 31/3275; G01R 31/00; G01R 31/2849; G01R 31/287; G01R 31/2874; G01R 31/2881; F28F 27/003; F28F 25/10; F28F 27/00; F28F 1/00; F28F 13/06; F28F 2250/08; F28D 20/00; F28D 20/0039; F28D 20/003; G05B 2219/33331; G05B 19/0425; G05B 23/0221; G05B 23/02; G05D 23/1931; H05K 7/20209; H05K 7/20136
   See application file for complete search history.

(56) References Cited

U.S. PATENT DOCUMENTS

| | | | |
|---|---|---|---|
| 8,150,561 B2 * | 4/2012 | Shimotono | G06F 1/206 702/132 |
| 8,749,187 B2 * | 6/2014 | Busch | H02P 1/04 388/934 |
| 10,488,901 B1 * | 11/2019 | Locke | H05K 7/20209 |
| 10,888,022 B2 * | 1/2021 | Chen | G06F 1/20 |
| 11,762,437 B2 * | 9/2023 | Lu | G06F 1/20 700/300 |
| 12,207,439 B2 * | 1/2025 | Prabhakar | G06F 1/3287 |
| 2023/0057741 A1 * | 2/2023 | Prabhakar | G06F 1/203 |

* cited by examiner

*Primary Examiner* — Vinh P Nguyen

(74) *Attorney, Agent, or Firm* — Greenberg Traurig, LLP

(57) ABSTRACT

A disclosed computing device capable of performing self-contained reliability testing may include (1) a cooling device and (2) circuitry communicatively coupled to the cooling device, wherein the circuitry is configured to (A) alternate between periods of high computing activity that increases heat emission and periods of low computing activity that decreases the heat emission and (B) direct the cooling device to decrease cooling power during the periods of high computing activity and increase the cooling power during the periods of low computing activity. Various other apparatuses, systems, and methods are also disclosed.

20 Claims, 10 Drawing Sheets

APPARATUS, SYSTEM, AND METHOD FOR PERFORMING SELF-CONTAINED RELIABILITY TESTING ON COMPUTING DEVICES

BACKGROUND

Prior to release and/or shipment, computing devices often undergo reliability testing. Some reliability testing may be performed with thermal test vehicles (TTVs) and/or temperature chambers. For example, manufacturers may design and/or use TTVs to simulate the thermal characteristics and/or outputs of certain integrated circuits, such as application-specific integrated circuits (ASICs). In this example, the manufacturers may apply and/or run these TTVs to verify the long-term reliability of the underlying design of the integrated circuits. Unfortunately, these TTVs may take a significant amount of time and/or money to accurately design, manufacture, and/or test.

In another example, manufacturers may subject certain samples of integrated circuits to various temperature changes within a temperature chamber over the course of several months. In this example, the temperature chamber may effectuate these temperature changes to verify the long-term reliability of the underlying design of the integrated circuits. Unfortunately, these temperature chambers may take a significant amount of time (e.g., a few months) to perform sufficient temperature cycling for the verification. Additionally or alternatively, these temperature chambers may be unable to push the temperatures high enough for accurate testing of certain integrated circuits due at least in part to the maximum temperature limits of other electrical components (e.g., capacitors) that support the integrated circuits under test.

The instant disclosure, therefore, identifies and addresses a need for additional and/or improved apparatuses, systems, and methods for performing self-contained reliability testing on computing devices.

SUMMARY

As will be described in greater detail below, the instant disclosure generally relates to apparatuses, systems, and methods for performing self-contained reliability testing on computing devices. In one example, a computing device for accomplishing such a task may include (1) a cooling device and (2) circuitry communicatively coupled to the cooling device, wherein the circuitry is configured to (A) alternate between periods of high computing activity that increases heat emission and periods of low computing activity that decreases the heat emission and (B) direct the cooling device to decrease cooling power during the periods of high computing activity and increase the cooling power during the periods of low computing activity.

Similarly, a system capable of performing self-contained reliability testing may include a chassis and a computing device installed in the chassis for reliability testing. In one example, the computing device may include (1) a cooling device and (2) circuitry communicatively coupled to the cooling device, wherein the circuitry is configured to (A) alternate between periods of high computing activity that increases heat emission and periods of low computing activity that decreases the heat emission and (B) direct the cooling device to decrease cooling power during the periods of high computing activity and increase the cooling power during the periods of low computing activity.

A corresponding method may include (1) communicatively coupling circuitry to a cooling device and (2) configuring the circuitry to (A) alternate between periods of high computing activity that increases heat emission and periods of low computing activity that decreases the heat emission and (B) direct the cooling device to decrease cooling power during the periods of high computing activity and increase the cooling power during the periods of low computing activity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
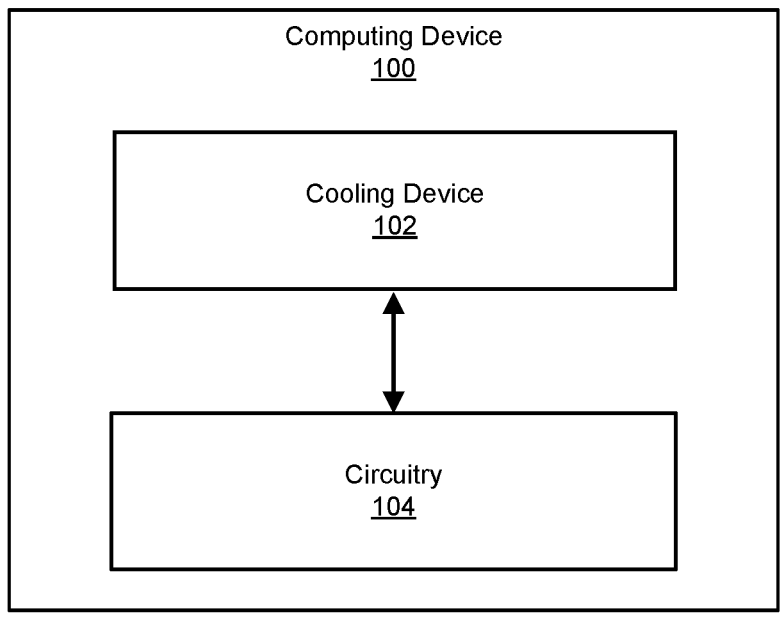
FIG. 1 is an illustration of an exemplary computing device capable of performing self-contained reliability testing in accordance with one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for performing self-contained reliability testing on computing devices. As will be explained in greater detail below, embodiments of the instant disclosure may enable computing devices to simulate their own life expectancies and/or aging performance or to verify the long-term reliability of their underlying designs without the need for TTVs and/or temperature chambers. Additionally or alternatively, embodiments of the instant disclosure may facilitate and/or support reliability testing of computing devices in much faster and/or shorter times when compared to conventional TTV-based and/or chamber-based reliability testing.

Moreover, embodiments of the instant disclosure may facilitate and/or support more affordable or cost-effective reliability testing of computing devices than conventional TTV-based and/or chamber-based reliability testing. Further, embodiments of the instant disclosure may enable computing devices to localize temperature increases and/or heat emissions within certain regions that represent the focus of the reliability testing, thereby avoiding temperature spikes in other regions populated with temperature-sensitive components (e.g., capacitors).

The following will provide, with reference to FIGS. 1-7, detailed descriptions of exemplary devices, systems, and corresponding implementations for performing self-contained reliability testing. Detailed descriptions of an exemplary self-contained reliability test performed by a computing device will be provided in connection with FIG. 8. Detailed descriptions of an exemplary method for performing self-contained reliability testing on computing devices will be provided in connection with FIG. 9. In addition, detailed descriptions of an exemplary computing system for carrying out such a method will be provided in connection with FIG. 10.

FIG. 1 illustrates an exemplary computing device 100 capable of performing self-contained reliability testing. As illustrated in FIG. 1, exemplary computing device 100 may include and/or represent a cooling device 102 and/or circuitry 104. In some examples, cooling device 102 and circuitry 104 may be communicatively and/or electrically coupled to one another. In one example, circuitry 104 may be configured to alternate and/or switch between periods of high computing activity that increases heat emission and periods of low computing activity that decreases heat emission relative to one another. In this example, the alternating and/or switching between periods of high computing activity and periods of low computing activity may constitute and/or represent part of a self-contained reliability test.

In some examples, circuitry 104 may be further configured to direct and/or cause cooling device 102 to decrease cooling power during periods of high computing activity and increase cooling power during periods of low computing activity. By doing so, circuitry 104 may be able to maximize the temperature differential and/or delta between the periods of high computing activity and the periods of low computing activity. In one example, the maximized temperature differential may enable circuitry 104 to speed up and/or expedite this self-contained reliability test relative to conventional TTV-based and/or chamber-based reliability testing.

In some examples, the periods of high computing activity may include and/or represent times during which circuitry 104 performs an amount, level, and/or degree of computing activity that is greater than other times. Conversely, the periods of low computing activity may include and/or represent times during which circuitry 104 performs an amount, level, and/or degree of computing activity that is less than other times. Accordingly, these differing amounts, levels, and/or degrees of computing activity may be viewed and/or considered high or low relative to one another. Additionally or alternatively, these differing amounts, levels, and/or degrees of computing activity may be viewed and/or considered high or low relative to certain thresholds and/or limits.

In some examples, the computing activity performed by circuitry 104 may generate and/or produce heat and/or thermal energy in connection with power consumption and/or usage. Accordingly, to increase the amount of heat emitted, circuitry 104 may perform and/or conduct higher and/or increased levels of computing activity. Conversely, to decrease the amount of heat emitted, circuitry 104 may perform and/or conduct lower and/or decreased levels of computing activity. Examples of such computing activity include, without limitation, traffic cycling (e.g., forwarding traffic to another device), accessing memory, reading from memory, writing to memory, generating computer graphics, overclocking, performing computations, performing cryptographic operations, executing software and/or scripts, combinations or variations of the same, and/or any other suitable computing activity.

In some examples, cooling device 102 may include and/or represent any type or form of device, component, and/or feature capable of generating and/or providing cooling power that cools and/or decreases the temperature of circuitry 104. In one example, cooling device 102 may facilitate, support, and/or provide multiple or variable states of cooling power. For example, when operational, cooling device 102 may cool and/or decrease the temperature of circuitry 104. In this example, when non-operational, cooling device 102 may fail to cool and/or decrease the temperature of circuitry 104. Additionally or alternatively, cooling device 102 may be capable of generating and/or providing various degrees and/or levels of cooling power for circuitry 104.

In some examples, the operation and/or non-operation of cooling device 102 may be controlled and/or directed by circuitry 104. In one example, cooling device 102 may include and/or represent a fan module equipped with one or more rotatable fans positioned to produce cooling airflow for circuitry 104. For example, the fan module may include and/or represent a collection of vanes and/or blades designed to generate and/or create airflow when rotating in one direction or another. In other words, the vanes and/or blades may produce currents of air as they rotate about a central axis point. Increasing the rotational speed of the vanes and/or blades may cause the fan module to generate more airflow and thus more cooling power. In contrast, decreasing the rotational speed of the vanes and/or blades may cause the fan module to generate less airflow and thus less cooling power.

In another example, cooling device 102 may include and/or represent a liquid cooler equipped with a pump that circulates cooling liquid through and/or over circuitry 104. In this example, the speed of the pump may be controlled and/or directed by circuitry 104. Increasing the speed of the pump may cause the liquid cooler to provide more liquid circulation and thus more cooling power. In contrast, decreasing the speed of the pump may cause the liquid cooler to provide less liquid circulation and thus less cooling power.

In some examples, circuitry 104 may include and/or represent one or more electrical and/or electronic circuits capable of processing, applying, modifying, transforming, transmitting, receiving, and/or executing instructions and/or data for computing device 100. In one example, circuitry 104 may access, read, write, and/or allocate memory on computing device 100. Additionally or alternatively, circuitry 104 may receive, handle, process, and/or forward traffic (e.g., data and/or control packets) on computing device 100.

In some examples, circuitry 104 may launch, perform, and/or execute certain executable files, code snippets, and/or computer-readable instructions to facilitate and/or support performing self-contained reliability testing on computing device 100. Although illustrated as a single unit in FIG. 1, circuitry 104 may include and/or represent a collection of multiple processing units and/or electrical or electronic components that work and/or operate in conjunction with one another. In one example, circuitry 104 may include and/or represent an ASIC. In another example, circuitry 104 may include and/or represent a central processing unit (CPU). Examples of circuitry 104 include, without limitation, processing devices, microprocessors, microcontrollers, graphics processing units (GPUs), field-programmable gate arrays (FPGAs), systems on chips (SoCs), parallel accelerated processors, tensor cores, integrated circuits, chiplets, optical modules, receivers, transmitters, transceivers, optical modules, traffic-forwarding devices, portions of one or more of the same, variations or combinations of one or more of the same, and/or any other suitable circuitry.

In some examples, computing device 100 may constitute and/or represent any type or form of physical computing device capable of reading computer-executable instructions, performing computations, transforming data, and/or handling network traffic. Examples of computing device 100 include, without limitation, network devices, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, personal digital assistants (PDAs), multimedia players, embedded systems, wearable devices, gaming consoles, portions of one or more of the same, variations or combinations of one or more of the same, and/or any other suitable computing devices. Additionally or alternatively, computing device 100 may simply constitute and/or represent the combination of cooling device 102 and circuitry 104.

Figure 2:
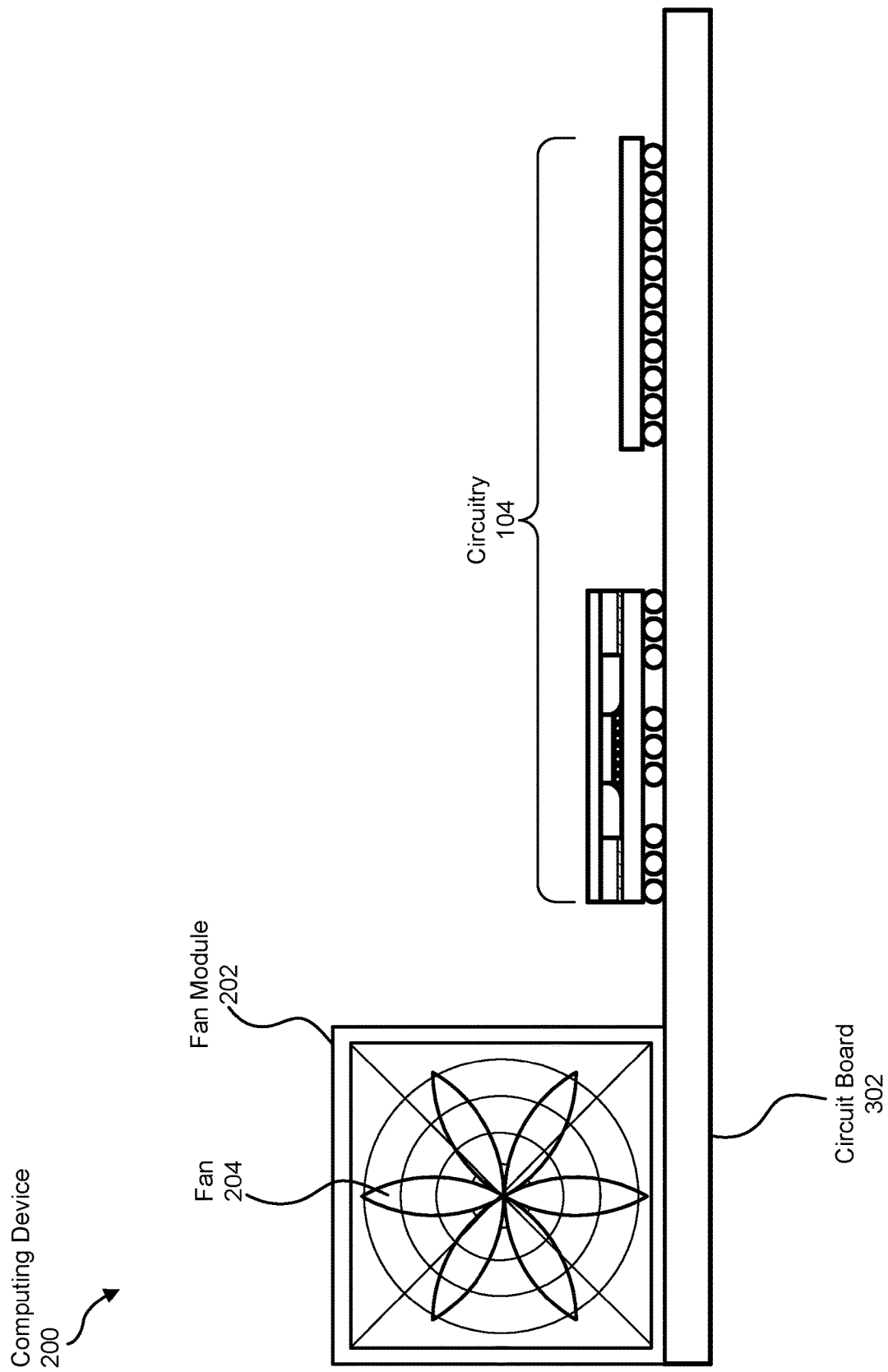
FIG. 2 is an illustration of an exemplary computing device capable of performing self-contained reliability testing in accordance with one or more embodiments of this disclosure.

FIG. 2 illustrates an exemplary computing device 200 that includes and/or represents circuitry 104, a circuit board 302, and/or a fan module 202. In some examples, computing device 200 may include and/or represent certain components, configurations, and/or features that perform and/or provide functionalities that are similar and/or identical to those described above in connection with FIG. 1. In one example, circuitry 104 may be communicatively and/or electrically coupled to a circuit board 302. Additionally or alternatively, circuitry 104 may be communicatively and/or electrically coupled to fan module 202.

In some examples, circuitry 104 may perform and/or execute a self-contained reliability test in connection with computing device 200. In such examples, the self-contained reliability test may involve and/or cause circuitry 104 to perform one or more operations. In one example, these operations may cause circuitry 104 to produce and/or emit heat as a result of the corresponding power consumption. Accordingly, circuitry 104 may generate and/or produce the heat emission necessary to perform and/or complete the reliability test without involving and/or utilizing any TTVs and/or dedicated heaters. In other words, a working example of the device under test may be able to generate and/or produce sufficient heat for the test on its own without relying on any TTVs and/or dedicated heaters.

Additionally or alternatively, by implementing a self-contained reliability test in this way, circuitry 104 may be able to localize the heat emission within a certain region (e.g., a specific ASIC, CPU, or integrated circuit) that constitutes and/or represents the focus of the reliability test. In other words, the heat emission may originate from the region subjected to the self-contained reliability test. As a result, circuitry 104 may be able to avoid and/or mitigate temperature spikes in other regions populated with temperature-sensitive components (e.g., capacitors) that are not necessarily the focus of the reliability test.

In some examples, to maximize the temperature differential between the periods of high computing activity and the periods of low computing activity, circuitry 104 may control the cooling power of fan module 202. For example, during the periods of high computing activity, circuitry 104 may direct and/or cause fan module 202 to decrease its cooling power by reducing and/or halting the rotation or speed of a fan 204. Conversely, during the periods of low computing activity, circuitry 104 may direct and/or cause fan module 202 to increase its cooling power by increasing and/or maximizing the rotation or speed of fan 204.

As a specific example, circuitry 104 may include and/or represent an ASIC under test. In this example, circuitry 104 may perform and/or execute a reliability test on the ASIC to simulate its life expectancy and/or aging by alternating between periods of high computing activity and periods of low computing activity. To do so, circuitry 104 may direct and/or cause the ASIC to receive, handle, and/or forward more traffic (e.g., packets) during the periods of high computing activity and less, if any, traffic during the periods of low computing activity. As a result, during the periods of high computing activity, the ASIC may generate and/or emit relatively high amounts and/or levels of heat. Conversely, during the periods of low computing activity, the ASIC may generate and/or emit relatively low amounts and/or levels of heat.

As another example, circuitry 104 may include and/or represent a CPU under test. In this example, circuitry 104 may perform and/or execute a reliability test on the CPU to simulate its life expectancy and/or aging by alternating between periods of high computing activity and periods of low computing activity. To do so, circuitry 104 may direct and/or cause the CPU to modify (e.g., access, read, and/or write to) regions of memory more during the periods of high computing activity and less, if at all, during the periods of low computing activity. Additionally or alternatively, circuitry 104 may direct and/or cause the CPU to execute certain software and/or scripts more during the periods of high computing activity and less, if at all, during the periods of low computing activity. As a result, during the periods of high computing activity, the CPU may generate and/or emit relatively high amounts and/or levels of heat. Conversely, during the periods of low computing activity, the CPU may generate and/or emit relatively low amounts and/or levels of heat.

In some examples, the self-contained reliability test may constitute and/or represent a life-expectancy and/or quality-assurance assessment or analysis. In one example, the reliability test may be viewed and/or considered self-contained because computing device 100 does not necessarily rely on and/or utilize a TTV or a temperature chamber to generate and/or provide the corresponding heat emission. Additionally or alternatively, the reliability test may be viewed and/or considered self-contained because computing device 100 and/or circuitry 104 constitutes the actual part and/or product for which the reliability test is performed, as opposed to a simulator (e.g., a TTV) on which the reliability test is performed for the purpose of estimating the life-expectancy and/or quality of a separate part and/or product.

Figure 3:
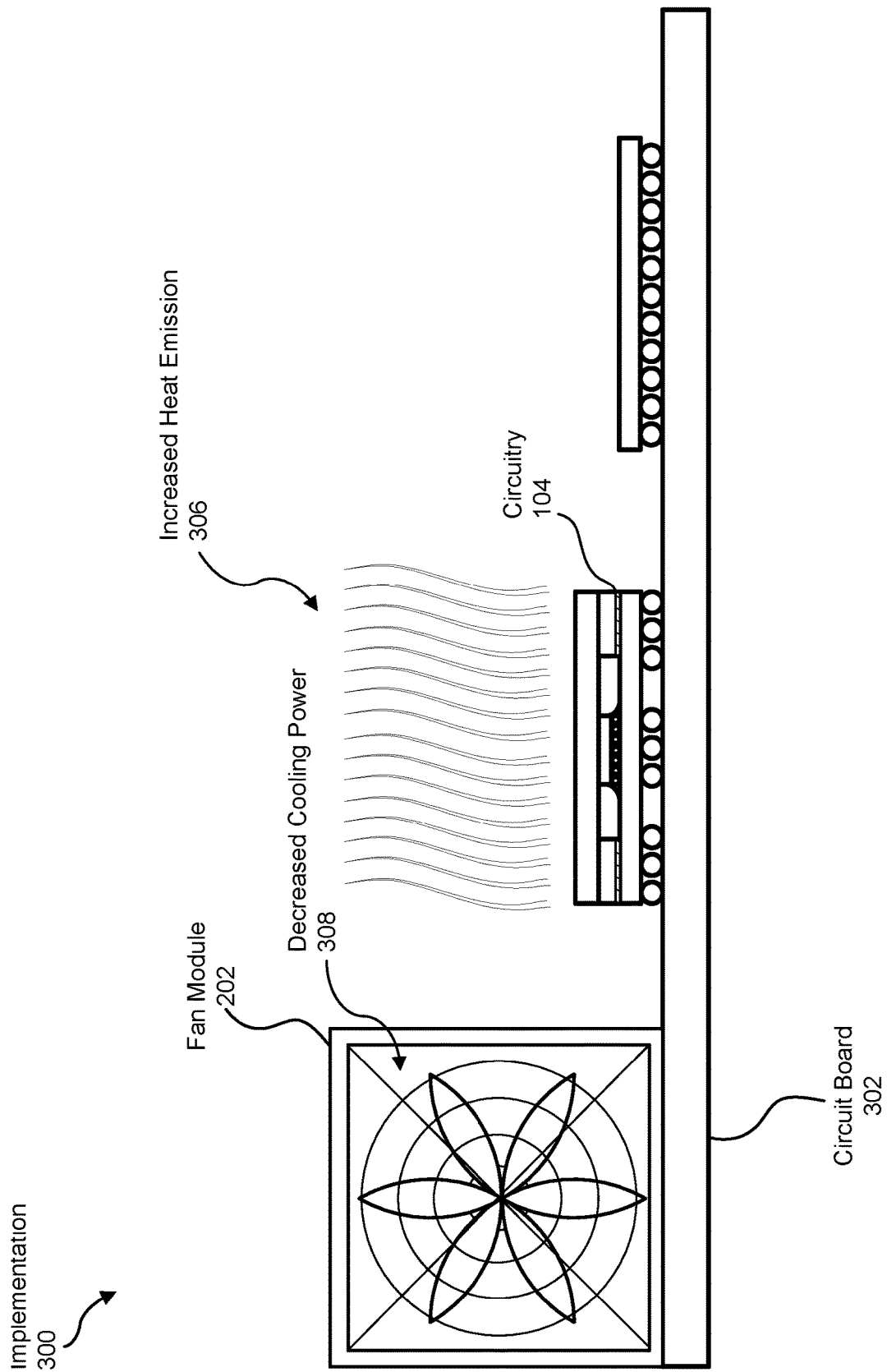
FIG. 3 is an illustration of an exemplary implementation of a computing device capable of performing self-contained reliability testing in accordance with one or more embodiments of this disclosure.
Figure 4:
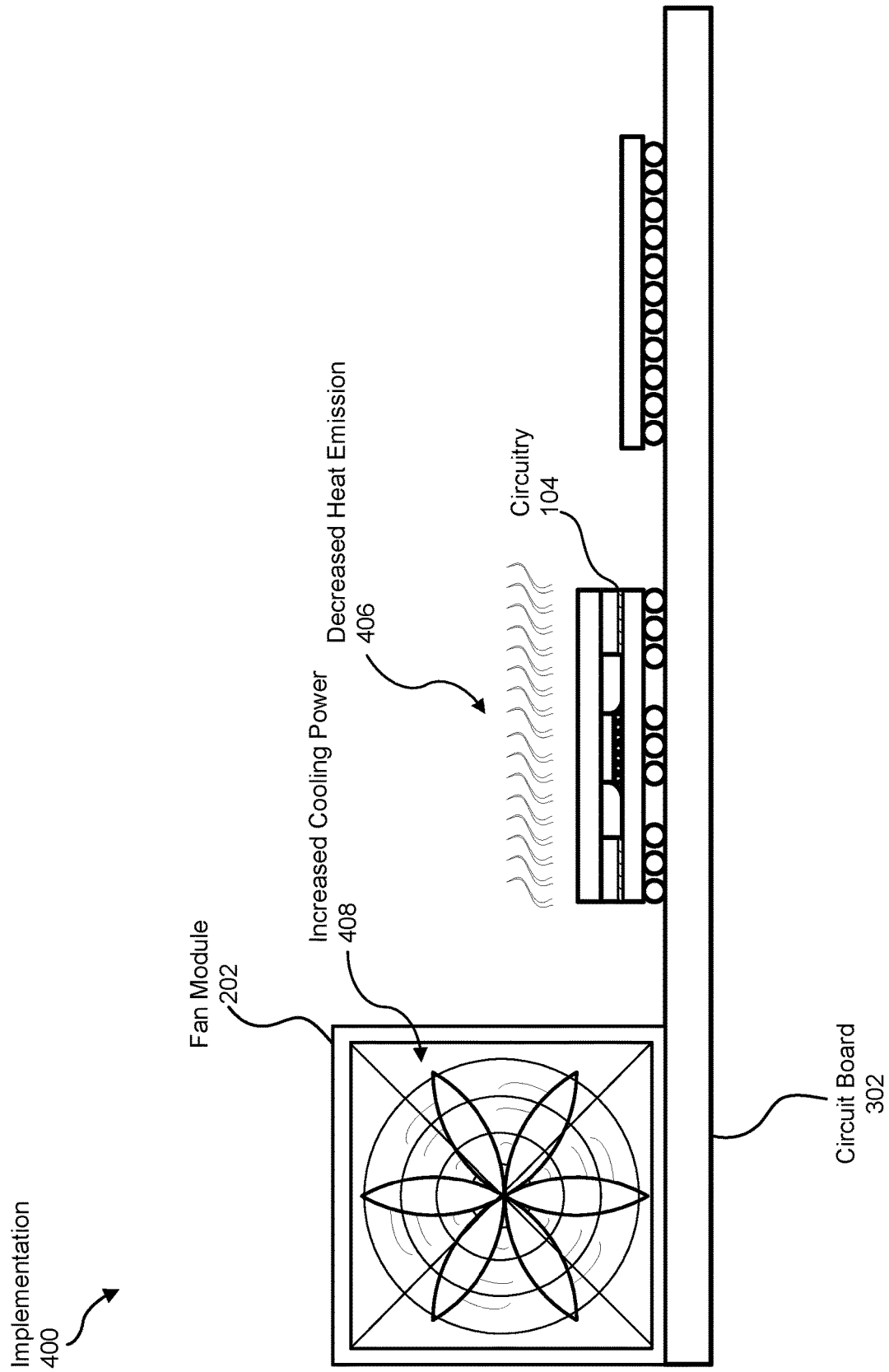
FIG. 4 is an illustration of an exemplary implementation of a computing device capable of performing self-contained reliability testing in accordance with one or more embodiments of this disclosure.

FIGS. 3 and 4 illustrate exemplary implementations 300 and 400 of a computing device that includes and/or represents circuitry 104, circuit board 302, and/or fan module 202. In some examples, implementations 300 and 400 may include and/or represent certain components, configurations, and/or features that perform and/or provide functionalities that are similar and/or identical to those described above in connection with either FIG. 1 or FIG. 2. In one example, implementation 300 may capture and/or represent a moment and/or period of high computing activity during which at least a portion of circuitry 104 (e.g., an ASIC and/or a CPU) produces increased heat emission 306 and/or decreased cooling power 308. As a result of increased heat emission 306 and decreased cooing power 308, the computing device may facilitate, promote, and/or provide a situation and/or opportunity in which the portion of circuitry 104 reaches a high and/or maximum temperature for a self-contained reliability test.

In one example, implementation 400 may capture and/or represent a moment and/or period of low computing activity during which the portion of circuitry 104 produces decreased heat emission 406 and/or increased cooling power 408. As a result of decreased heat emission 406 and increased cooing power 408, the computing device may facilitate, promote, and/or provide a situation and/or opportunity in which the portion of circuitry 104 reaches a low and/or minimum temperature for the self-contained reliability test.

Figure 5:
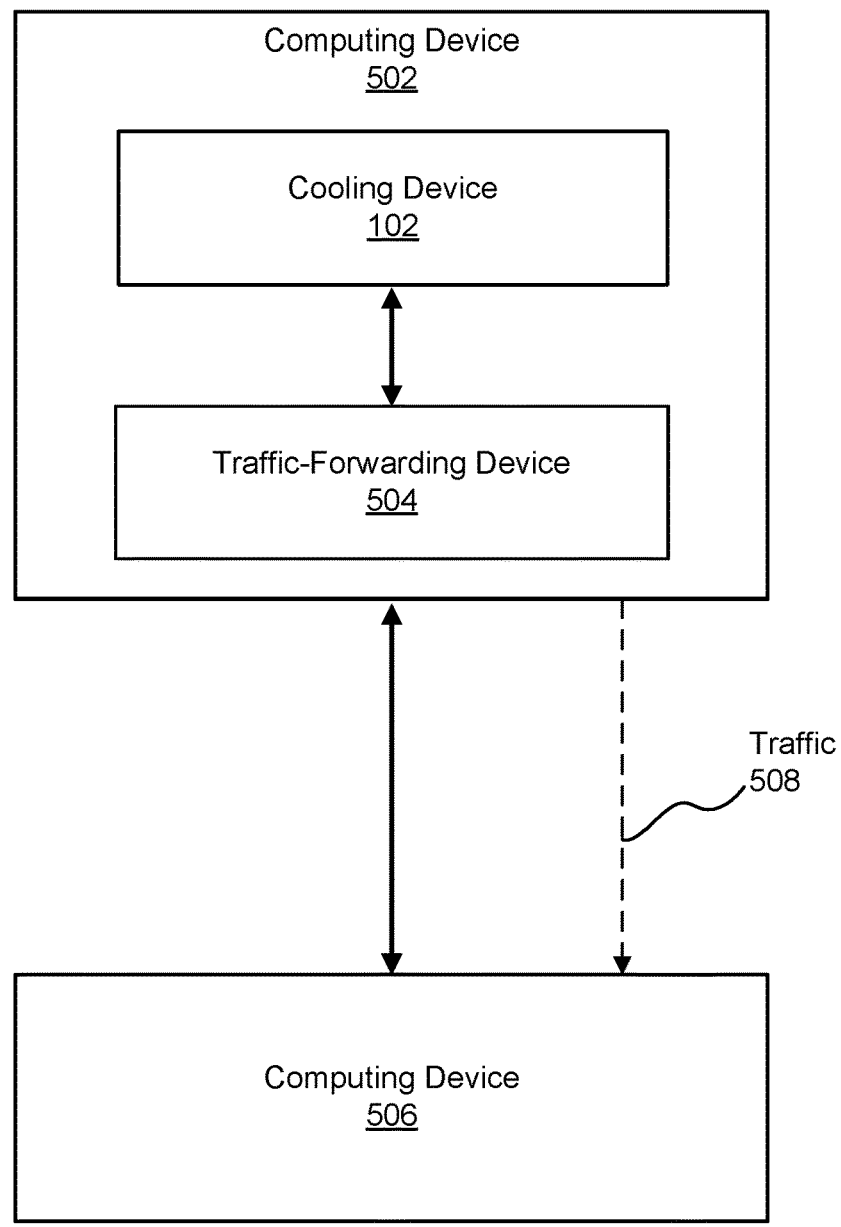
FIG. 5 is an illustration of an exemplary implementation of a computing device capable of performing self-contained reliability testing in accordance with one or more embodiments of this disclosure.

FIG. 5 illustrates an exemplary implementation 500 of a computing device 502 and a computing device 506 that are communicatively and/or electrically coupled to one another via a direct connection and/or an indirect connection (e.g., through a network). In some examples, implementation 500 may include and/or represent certain components, configurations, and/or features that perform and/or provide functionalities that are similar and/or identical to those described above in connection with any of FIGS. 1-4. In one example, traffic-forwarding device 504 may be communicatively and/or electrically coupled to cooling device 102. Examples of traffic-forwarding device 504 include, without limitation, ASICs, SoCs, ports, optical modules, receivers, transmitters, transceivers, portions of one or more of the same, variations or combinations of one or more of the same, and/or any other suitable traffic-forwarding device.

In some examples, traffic-forwarding device 504 may forward, transmit, and/or send traffic 508 to computing device 506 as part of a traffic-cycling feature in a self-contained reliability test. In one example, traffic 508 may include and/or represent a stream of packets transferred from computing device 502 to computing device 506. In this example, traffic-forwarding device 504 may forward more packets during periods of high computing activity and less packets during periods of low computing activity.

In some examples, computing device 506 may monitor and/or track the performance and/or failures of traffic-forwarding device 504 during the self-contained reliability testing. For example, computing device 506 may identify, record, and/or report the number of packet drops detected during the self-contained reliability test. In one example, traffic-forwarding device 504 may vary and/or select the sizes of the packets forwarded to computing device 506 to maximize the temperature differential between the periods of high computing activity and the periods of low computing activity.

In some examples, computing device 502 may be installed into a test chassis that conducts and/or directs the self-contained reliability testing. In one example, computing device 506 may include and/or represent all or a portion of such a test chassis. In certain implementations, one or more other computing devices may also be installed into the test chassis for self-contained reliability testing.

Figure 6:
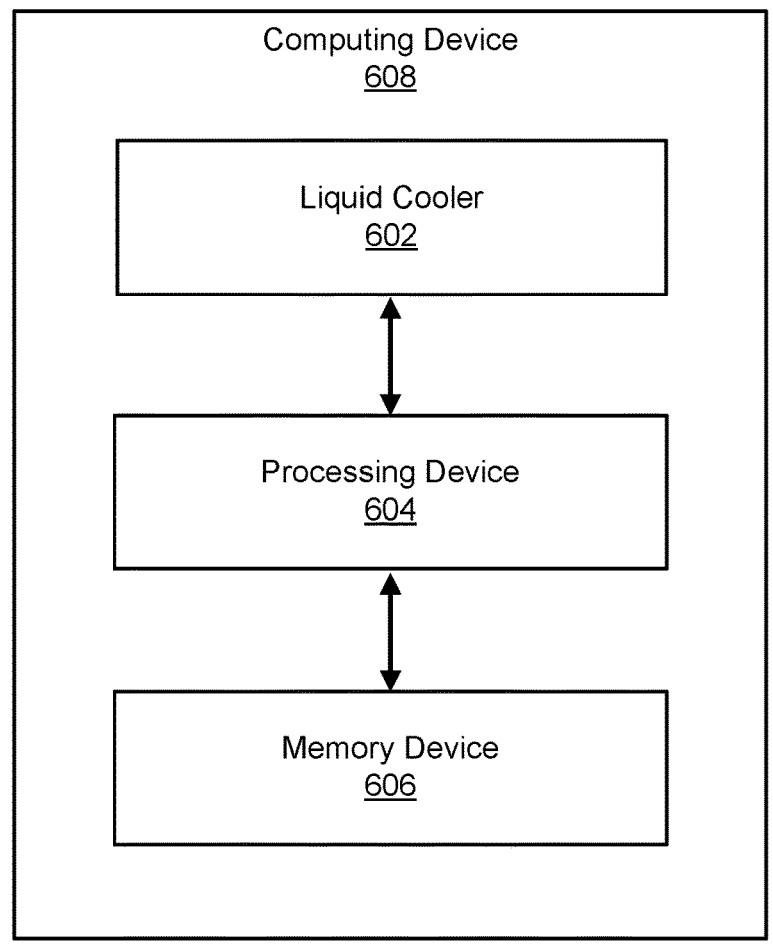
FIG. 6 is an illustration of an exemplary implementation of a computing device capable of performing self-contained reliability testing in accordance with one or more embodiments of this disclosure.

FIG. 6 illustrates an exemplary implementation 600 of a computing device 608 that includes a liquid cooler 602, a processing device 604, and/or a memory device 606. In some examples, implementation 600 may include and/or represent certain components, configurations, and/or features that perform and/or provide functionalities that are similar and/or identical to those described above in connection with any of FIGS. 1-5. In one example, processing device 604 may be communicatively and/or electrically coupled to liquid cooler 602 and/or a memory device 606. Examples of processing device 604 include, without limitation, CPUs, microprocessors, microcontrollers, GPUs, FPGAs, SoCs, parallel accelerated processors, portions of one or more of the same, variations or combinations of one or more of the same, and/or any other suitable processing device.

In some examples, memory device 606 may include and/or represent any type or form of volatile or non-volatile memory device or medium capable of storing data and/or computer-readable instructions. In one example, memory device 606 may store, load, and/or maintain certain modules and/or computer-readable instructions executed by processing device 604. Examples of memory device 606 include, without limitation, random access memory (RAM), read only memory (ROM), flash memory, hard disk drives (HDDs), solid-state drives (SSDs), optical disk drives, caches, portions of one or more of the same, variations or combinations of one or more of the same, and/or any other suitable memory devices.

In one example, processing device 604 may perform and/or execute a reliability test by simulating its life expectancy and/or aging by alternating between periods of high computing activity and periods of low computing activity. To do so, processing device 604 may modify (e.g., access, read, and/or write to) regions of memory device 606 more during the periods of high computing activity and less, if at all, during the periods of low computing activity. For example, processing device 604 may perform more read and/or write operations on memory device 606 during the periods of high computing activity and less read and/or write operations, if any at all, during the periods of low computing activity.

Additionally or alternatively, circuitry 104 may direct and/or cause the CPU to execute certain software and/or scripts more during the periods of high computing activity and less, if at all, during the periods of low computing activity. As a result, during the periods of high computing activity, the CPU may generate and/or emit relatively high amounts and/or levels of heat. Conversely, during the periods of low computing activity, the CPU may generate and/or emit relatively low amounts and/or levels of heat.

In another example, liquid cooler 602 may be equipped with a pump that circulates cooling liquid through and/or over processing device 604. In this example, the speed of the pump may be controlled and/or directed by processing device 604. Increasing the speed of the pump may cause liquid cooler 602 to provide more liquid circulation and thus more cooling power to processing device 604 during periods of low computing activity. In contrast, decreasing the speed of the pump may cause liquid cooler 602 to provide less liquid circulation and thus less cooling power to processing device 604 during periods of high computing activity.

Figure 7:
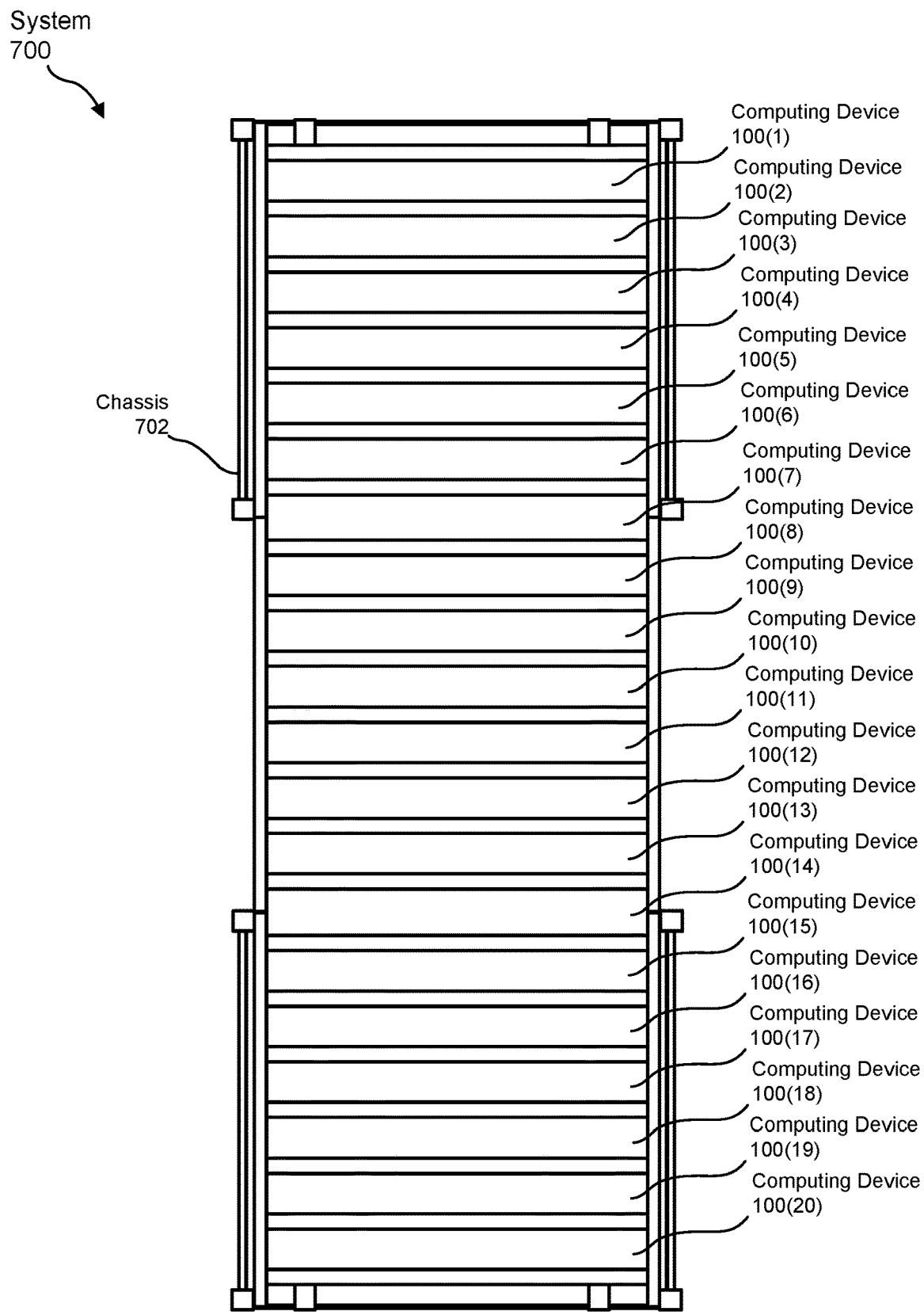
FIG. 7 is an illustration of an exemplary system for performing self-contained reliability testing on computing devices in accordance with one or more embodiments of this disclosure.

FIG. 7 illustrates an exemplary system 700 that includes a chassis 702 and computing devices 100(1), 100(2), 100(3), 100(4), 100(5), 100(6), 100(7), 100(8), 100(9), 100 (10), 100 (11), 100 (12), 100 (13), 100 (14), 100 (15), 100 (16), 100 (17), 100 (18), 100 (19), and 100 (20). In some examples, system 700 may include and/or represent certain components, configurations, and/or features that perform and/or provide functionalities that are similar and/or identical to those described above in connection with any of FIGS. 1-6. In one example, computing device 100(1)-(20) may be installed into chassis 702 for testing purposes. In this example, chassis 702 may conduct, direct, and/or orchestrate self-contained reliability testing for computing devices 100 (1)-(20).

Figure 8:
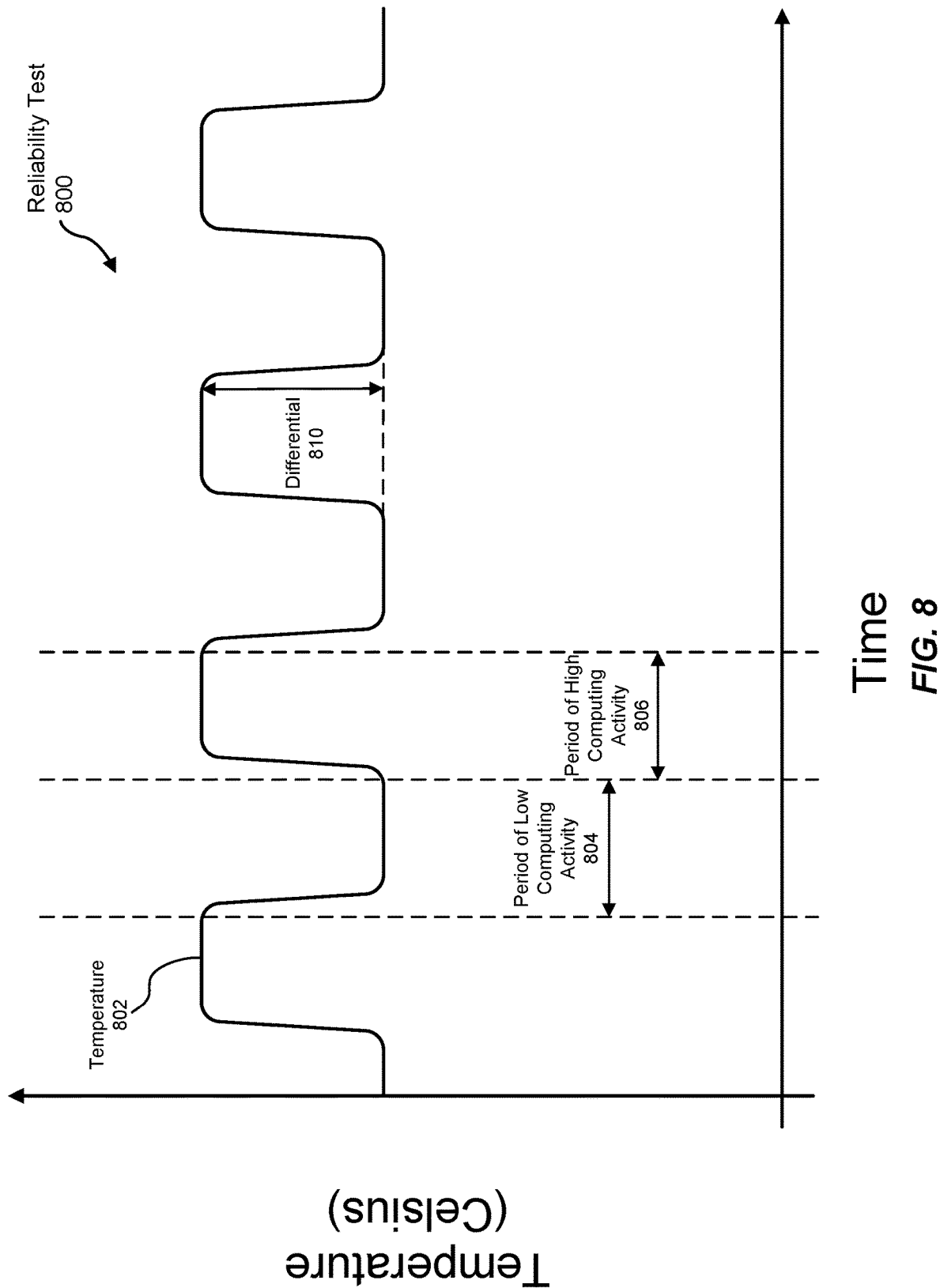
FIG. 8 is an illustration of an exemplary self-contained reliability test performed by a computing device in accordance with one or more embodiments of this disclosure.

FIG. 8 illustrates a portion of an exemplary reliability test 800 that involves and/or represents periods of high computing activity and periods of low computing activity. In some examples, reliability test 800 may rely on and/or leverage certain components, configurations, and/or features that perform and/or provide functionalities that are similar and/or identical to those described above in connection with any of FIGS. 1-7. In one example, reliability test 800 may be performed by computing device 100 to verify the long-term reliability of circuitry 104. In this example, reliability test 800 may involve and/or be influenced by a temperature 802 of circuitry 104.

In some examples, temperature 802 may correspond to and/or represent the operating temperature (in Celsius) of all or a portion of circuitry 104 (e.g., an ASIC and/or a CPU) over time. Additionally or alternatively, reliability test 800 may involve and/or represent a period of low computing activity 804 and a period of high computing activity 806. In one example, period of low computing activity 804 and one or more similar periods may each last and/or represent less than thirty minutes (e.g., fifteen minutes, seven and a half minutes, etc.). In this example, period of high computing activity 806 and one or more similar periods may each last and/or represent less than thirty minutes (e.g., fifteen minutes, seven and a half minutes, etc.). In certain implementations, reliability test 800 may involve and/or represent various other similar periods that are not necessarily illustrated and/or labelled in FIG. 8.

In some examples, reliability test 800 may involve and/or represent a differential 810 of temperature 802 during at least some of the periods of high and low computing activity. In one example, differential 810 may include and/or represent a temperature difference and/or delta of at least twenty degrees (e.g., twenty-five degrees, thirty degrees, etc.) Celsius.

In some examples, reliability test 800 may last and/or be completed in less than two months (e.g., one month, two weeks, etc.). As a specific example, due to the ability of circuitry 104 to vary its operating temperature quickly, reliability test 800 may be performed to completion in approximately 11 days. Additionally or alternatively, reliability test 800 may involve and/or represent alternating between the periods of high and low activity at least nine hundred times (e.g., nine hundred and fifty times, one thousand times, two thousand times, etc.).

In some examples, the various devices and systems described in connection with FIGS. 1-7 may include and/or represent one or more additional circuits, components, and/or features that are not necessarily illustrated and/or labeled in FIGS. 1-7. For example, the devices illustrated in FIGS. 1-7 may also include and/or represent additional analog and/or digital circuitry, onboard logic, transistors, RF transmitters, RF receivers, transceivers, antennas, resistors, capacitors, diodes, inductors, switches, registers, flipflops, connections, traces, buses, semiconductor (e.g., silicon) devices and/or structures, processing devices, storage devices, circuit boards, sensors, packages, substrates, housings, combinations or variations of one or more of the same, and/or any other suitable components that facilitate and/or support self-contained reliability testing. In certain implementations, one or more of these additional circuits, components, and/or features may be inserted and/or applied between any of the existing circuits, components, and/or features illustrated in FIGS. 1-7 consistent with the aims and/or objectives described herein. Accordingly, the couplings and/or connections described with reference to FIGS. 1-7 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

Figure 9:
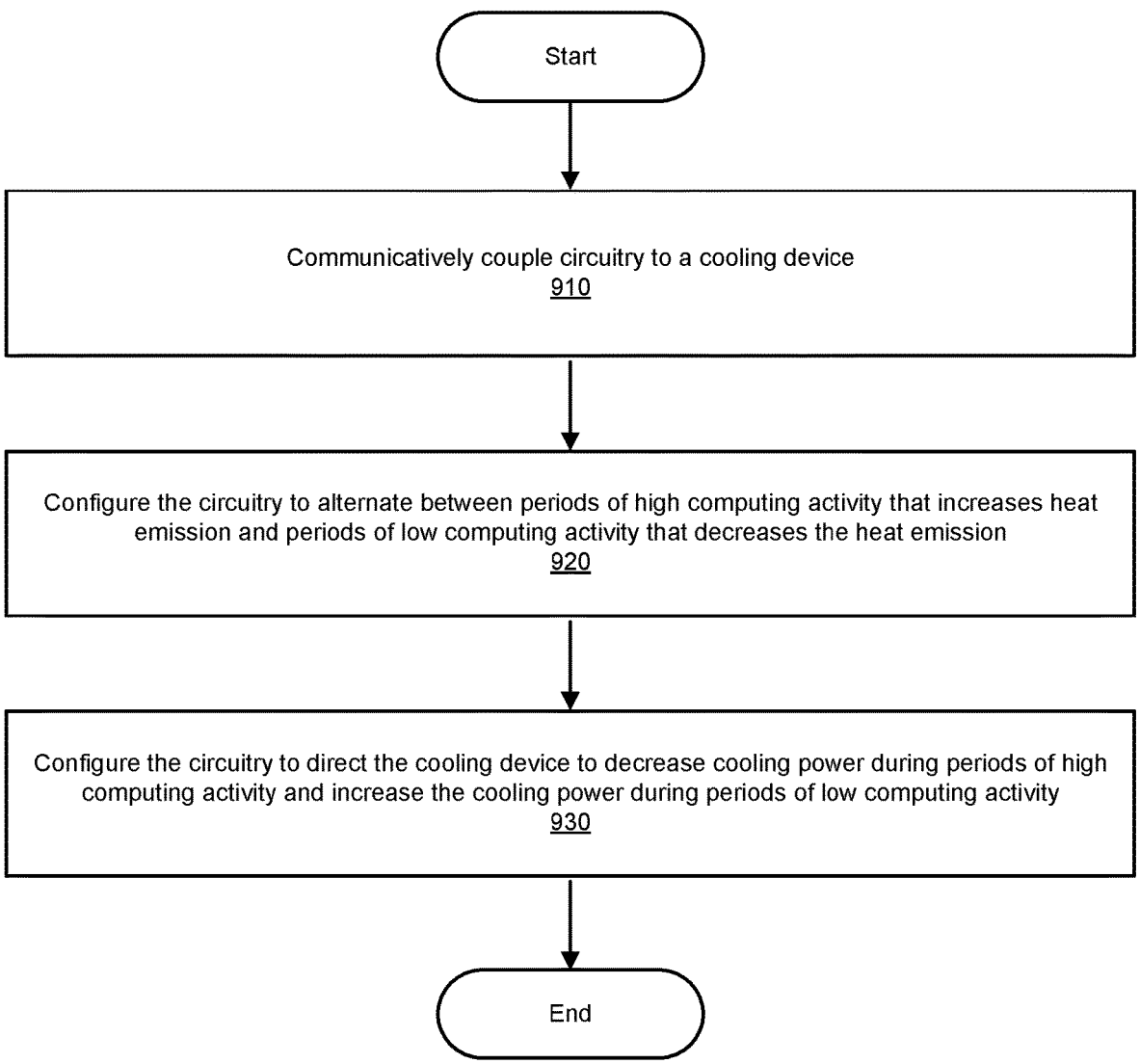
FIG. 9 is a flow diagram of an exemplary method for assembling and/or manufacturing hybrid circuit TTVs in accordance with one or more embodiments of this disclosure.

FIG. 9 is a flow diagram of an exemplary method 900 for configuring, assembling, and/or programming computing devices capable of performing self-contained reliability testing. In one example, the steps shown in FIG. 9 may be achieved and/or accomplished by a computing equipment manufacturer or subcontractor that creates and/or produces computing devices capable of performing self-contained reliability testing. Additionally or alternatively, the steps shown in FIG. 9 may incorporate and/or involve certain sub-steps and/or variations consistent with the descriptions provided above in connection with FIGS. 1-8.

As illustrated in FIG. 9, method 900 may include the step of communicatively coupling circuitry to a cooling device (910). Step 910 may be performed in a variety of ways, including any of those described above in connection with FIGS. 1-8. For example, a computing equipment manufacturer or subcontractor may communicatively and/or electrically couple circuitry to a cooling device. In this example, the cooling device may include and/or represent a fan module and/or a liquid cooler kit.

Method 900 may also include the step of configuring the circuitry to alternate between periods of high computing activity that increases heat emission and periods of low computing activity that decreases the heat emission (920). Step 920 may be performed in a variety of ways, including any of those described above in connection with FIGS. 1-8. For example, the computing equipment manufacturer or subcontractor may configure and/or program the circuitry to alternate between periods of high computing activity that increases heat emission and periods of low computing activity that decreases the heat emission. In this example, the circuitry may include and/or represent an ASIC and/or CPU under test.

Method 900 may also include the step of configuring the circuitry to direct the cooling device to decrease cooling power during the periods of high computing activity and increase the cooling power during the periods of low computing activity (930). Step 930 may be performed in a variety of ways, including any of those described above in connection with FIGS. 1-8. For example, the computing equipment manufacturer or subcontractor may configure and/or program the circuitry to direct the cooling device to decrease cooling power during the periods of high computing activity and increase the cooling power during the periods of low computing activity. By doing so, the circuitry may be able to expand and/or maximize a temperature differential and/or delta for its own operating temperature between the periods of high computing activity and low computing activity as part of a self-contained reliability test.

Figure 10:
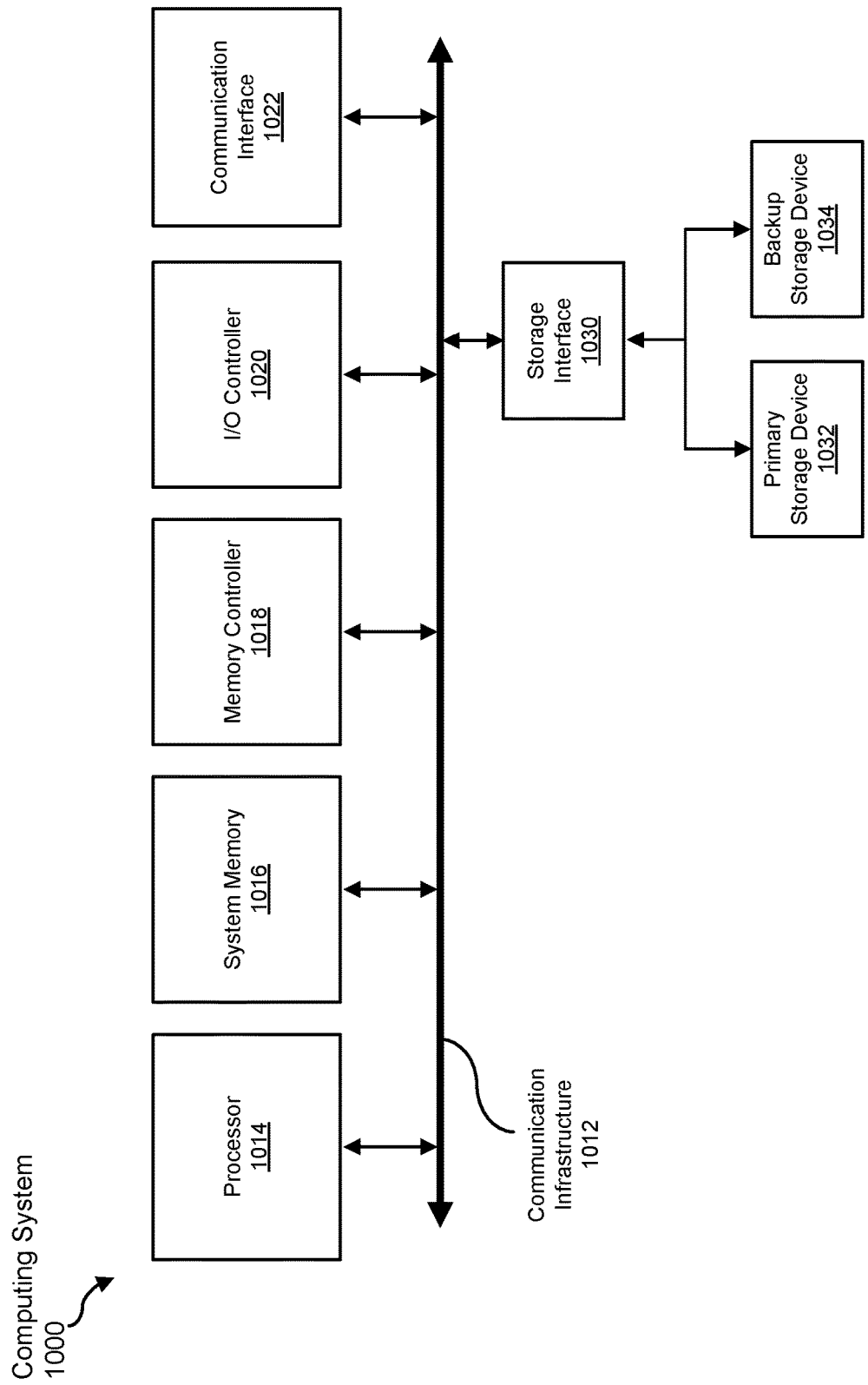
FIG. 10 is a block diagram of an exemplary computing system capable of implementing and/or being used in connection with one or more of the embodiments described and/or illustrated herein.

FIG. 10 is a block diagram of an exemplary computing system 1000 capable of implementing and/or being used in connection with one or more of the embodiments described and/or illustrated herein. In some embodiments, all or a portion of computing system 1000 may perform and/or be a means for performing, either alone or in combination with other elements, one or more of the steps described in connection with FIG. 3. All or a portion of computing system 1000 may also perform and/or be a means for performing and/or implementing any other steps, methods, or processes described and/or illustrated herein.

Computing system 1000 broadly represents any type or form of electrical load, including a single or multi-processor computing device or system capable of executing computer-readable instructions. Examples of computing system 1000 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1000 may be programmed, configured, and/or otherwise designed to comply with one or more networking protocols. According to certain embodiments, computing system 1000 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1000 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1000 may include various network and/or computing components. For example, computing system 1000 may include at least one processor 1014 and a system memory 1016. Processor 1014 generally represents any type or form of processing unit capable of processing data or interpreting and executing instructions. For example, processor 1014 may represent an application-specific integrated circuit (ASIC), a system on a chip (e.g., a network processor), a hardware accelerator, a general purpose processor, and/or any other suitable processing element.

Processor 1014 may process data according to one or more of the networking protocols discussed above. For example, processor 1014 may execute or implement a portion of a protocol stack, may process packets, may perform memory operations (e.g., queuing packets for later processing), may execute end-user applications, and/or may perform any other processing tasks.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1000 may include both a volatile memory unit (such as, for example, system memory 1016) and a non-volatile storage device (such as, for example, primary storage device 1032, as described in detail below). System memory 1016 may be implemented as shared memory and/or distributed memory in a network device. Furthermore, system memory 1016 may store packets and/or other information used in networking operations.

In certain embodiments, exemplary computing system 1000 may also include one or more components or elements in addition to processor 1014 and system memory 1016. For example, as illustrated in FIG. 10, computing system 1000 may include a memory controller 1018, an Input/Output (I/O) controller 1020, and a communication interface 1022, each of which may be interconnected via communication infrastructure 1012. Communication infrastructure 1012 generally represents any type or form of infrastructure capable of facilitating communication between one or more components of a computing device. Examples of communication infrastructure 1012 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1018 generally represents any type or form of device capable of handling memory or data or controlling communication between one or more components of computing system 1000. For example, in certain embodiments memory controller 1018 may control communication between processor 1014, system memory 1016, and I/O controller 1020 via communication infrastructure 1012. In some embodiments, memory controller 1018 may include a Direct Memory Access (DMA) unit that may transfer data (e.g., packets) to or from a link adapter.

I/O controller 1020 generally represents any type or form of device or module capable of coordinating and/or controlling the input and output functions of a computing device. For example, in certain embodiments I/O controller 1020 may control or facilitate transfer of data between one or more elements of computing system 1000, such as processor 1014, system memory 1016, communication interface 1022, and storage interface 1030.

Communication interface 1022 broadly represents any type or form of communication device or adapter capable of facilitating communication between exemplary computing system 1000 and one or more additional devices. For example, in certain embodiments communication interface 1022 may facilitate communication between computing system 1000 and a private or public network including additional computing systems. Examples of communication interface 1022 include, without limitation, a link adapter, a wired network interface (such as a network interface card), a wireless network interface (such as a wireless network interface card), and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1022 may also represent a host adapter configured to facilitate communication between computing system 1000 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also enable computing system 1000 to engage in distributed or remote computing. For example, communication interface 1022 may receive instructions from a remote device or send instructions to a remote device for execution.

As illustrated in FIG. 10, exemplary computing system 1000 may also include a primary storage device 1032 and/or a backup storage device 1034 coupled to communication infrastructure 1012 via a storage interface 1030. Storage devices 1032 and 1034 generally represent any type or form of storage device or medium capable of storing data and/or other computer-readable instructions. For example, storage devices 1032 and 1034 may represent a magnetic disk drive (e.g., a so-called hard drive), a solid state drive, a floppy disk drive, a magnetic tape drive, an optical disk drive, a flash drive, or the like. Storage interface 1030 generally represents any type or form of interface or device for transferring data between storage devices 1032 and 1034 and other components of computing system 1000.

In certain embodiments, storage devices 1032 and 1034 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1034 may also include other similar structures or devices for allowing computer software, data, or other computer-readable instructions to be loaded into computing system 1000. For example, storage devices 1032 and 1034 may be configured to read and write software, data, or other computer-readable information. Storage devices 1032 and 1034 may be a part of computing system 1000 or may be separate devices accessed through other interface systems.

Many other devices or subsystems may be connected to computing system 1000. Conversely, all of the components and devices illustrated in FIG. 10 need not be present to practice the embodiments described and/or illustrated herein. The devices and subsystems referenced above may also be interconnected in different ways from those shown in FIG. 10. Computing system 1000 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of computing device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
a cooling device; and
circuitry communicatively coupled to the cooling device, wherein the circuitry is configured to:
alternate between periods of high computing activity that increases heat emission and periods of low computing activity that decreases the heat emission; and
direct the cooling device to decrease cooling power during the periods of high computing activity and increase the cooling power during the periods of low computing activity.

2. The computing device of claim 1, wherein the circuitry is configured to perform a self-contained reliability test on the computing device by simulating a life expectancy of the computing device via the alternating periods of high computing activity and low computing activity.

3. The computing device of claim 2, wherein the self-contained reliability test involves performing one or more operations that cause the circuitry to produce the heat emission.

4. The computing device of claim 3, wherein the circuitry produces the heat emission without involving any thermal test vehicles or dedicated heaters.

5. The computing device of claim 2, wherein the circuitry is configured to localize the heat emission within a certain region subject to the self-contained reliability test.

6. The computing device of claim 2, wherein the circuitry is configured to complete the self-contained reliability test in less than one month.

7. The computing device of claim 6, wherein the self-contained reliability test involves alternating between the periods of high computing activity and the periods of low computing activity at least one nine hundred times in less than the one month.

8. The computing device of claim 1, wherein the alternating periods of high computing activity and low computing activity cause the circuitry to produce a temperature differential of at least twenty degrees Celsius.

9. The computing device of claim 1, wherein the circuitry comprises a traffic-forwarding device configured to forward traffic to another device.

10. The computing device of claim 9, wherein the traffic-forwarding device is configured to forward more of the traffic during the periods of high computing activity and less of the traffic during the periods of low computing activity.

11. The computing device of claim 1, wherein the circuitry comprises a processing device configured to modify regions of memory in a memory device.

12. The computing device of claim 11, wherein the processing device is configured to perform more modifications to the regions of memory during the periods of high computing activity and less modifications to the regions of memory during the periods of low computing activity.

13. The computing device of claim 12, wherein the cooling device comprises a fan module configured to decrease a rotation speed of at least one fan during the periods of high computing activity and increase the rotation speed of the fan during the periods of low computing activity.

14. The computing device of claim 12, wherein the cooling device comprises a liquid cooler configured to decrease a speed of a pump during the periods of high computing activity and increase the speed of the pump during the periods of low computing activity.

15. The computing device of claim 12, wherein:
each of the periods of high computing activity lasts less than thirty minutes; and
each of the periods of low computing activity lasts less than thirty minutes.

16. A system comprising:
a chassis; and
a computing device installed in the chassis for reliability testing, the computing device comprising:
a cooling device; and
circuitry communicatively coupled to the cooling device, wherein the circuitry is configured to:
alternate between periods of high computing activity that increases heat emission and periods of low computing activity that decreases the heat emission; and
direct the cooling device to decrease cooling power during the periods of high computing activity and increase the cooling power during the periods of low computing activity.

17. The system of claim 16, wherein the circuitry is configured to perform a self-contained reliability test on the computing device by simulating a life expectancy of the computing device via the alternating periods of high computing activity and low computing activity.

18. The system of claim 17, wherein the self-contained reliability test involves performing one or more operations that cause the circuitry to produce the heat emission.

19. The system of claim 17, wherein the circuitry is configured to localize the heat emission within a certain region subject to the self-contained reliability test.

20. A method comprising:
communicatively coupling circuitry to a cooling device; and configuring the circuitry to:
  alternate between periods of high computing activity that increases heat emission and periods of low computing activity that decreases the heat emission; and
  direct the cooling device to decrease cooling power during the periods of high computing activity and increase the cooling power during the periods of low computing activity.

* * * * *